United States Patent [19]

Camerini Porzi

[11] Patent Number: 4,949,632
[45] Date of Patent: Aug. 21, 1990

[54] CIRCUIT FOR MONITORING AND CONTROLLING THE FLOW OF HOT AIR IN EQUIPMENT FOR ROASTING COFFEE, NUTS AND SIMILAR EDIBLE COMMODITIES

[75] Inventor: Pier Cesare Camerini Porzi, Casalecchio di Reno, Italy

[73] Assignee: Officine Vittoria S.p.A., Bologna, Italy

[21] Appl. No.: 277,189

[22] Filed: Nov. 29, 1988

[30] Foreign Application Priority Data

Dec. 4, 1987 [IT] Italy .................................. 3720 A/87

[51] Int. Cl.⁵ ...................... A47J 31/42; A47J 42/52; F26B 3/08; F26B 9/08
[52] U.S. Cl. ........................................ 99/468; 34/10; 34/57 R; 99/323.7; 99/331; 99/483
[58] Field of Search ............ 99/323.7, 325, 326, 99/331, 352, 353, 451, 467, 468, 473, 483, 486; 34/10, 57 A, 57 R, 57 E; 219/400, 502; 426/233, 595, 467

[56] References Cited

U.S. PATENT DOCUMENTS

| | | | |
|---|---|---|---|
| 1,970,499 | 8/1934 | Dent | 99/468 |
| 2,301,922 | 11/1942 | Atti | 99/331 |
| 3,964,175 | 6/1976 | Sivetz | 34/10 |
| 4,169,164 | 9/1979 | Hubbard et al. | 99/474 |
| 4,326,114 | 4/1982 | Gerling et al. | 99/451 |
| 4,484,064 | 11/1984 | Murray | 219/400 |
| 4,597,190 | 7/1986 | Camerini | 34/57 A |
| 4,642,906 | 2/1987 | Kaatze et al. | 99/286 |
| 4,748,030 | 5/1988 | Illy | 99/468 |
| 4,813,347 | 3/1989 | Yoshida | 99/483 |

FOREIGN PATENT DOCUMENTS

3450A82 7/1982 Italy .

Primary Examiner—Timothy F. Simone
Attorney, Agent, or Firm—Balogh, Osann, Kramer, Dvorak, Genova & Traub

[57] ABSTRACT

A circuit permits of monitoring the temperature and the color of coffee in the drums of roasting equipment, and controlling the flow of hot air with dampers operated in pairs by respective stepping motors. The dampers are moved through a succession of proportioning positions in a definite sequence of two stages; an initial, continuous movement that approximates to the thermal transition required, followed by a series of discrete steps producing a fine adjustment; thus it becomes possible to ensure that the set pre-roast and roast temperatures are reached in the drums at the prescribed moment in time.

5 Claims, 2 Drawing Sheets

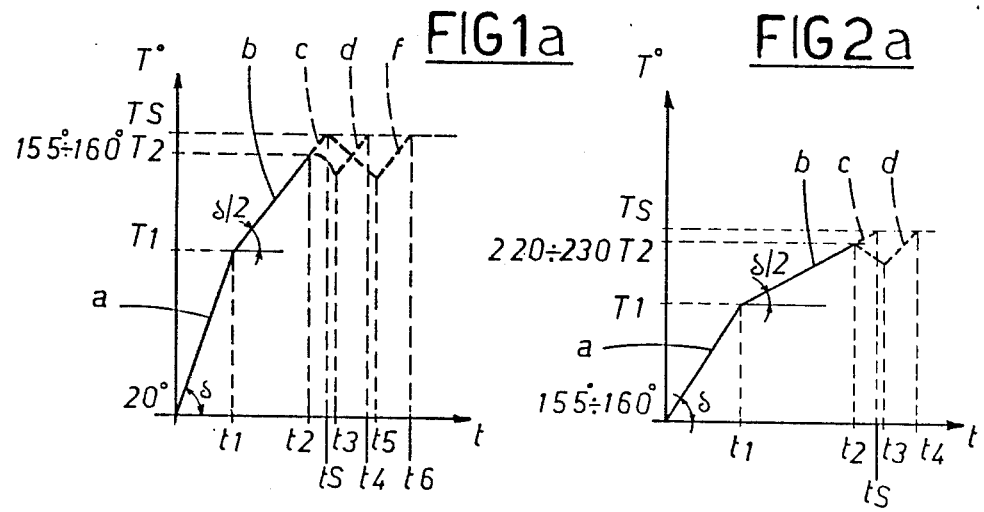
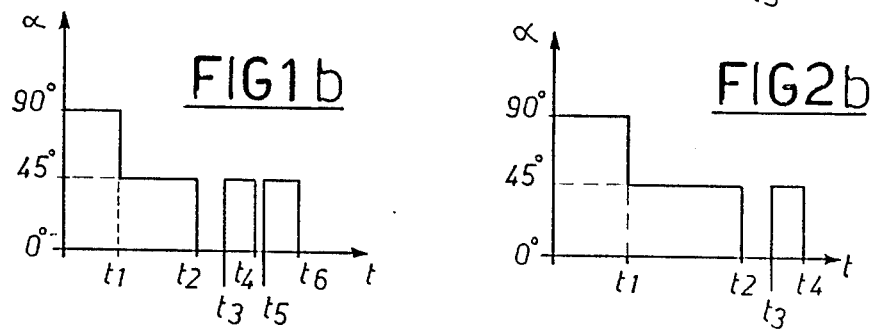
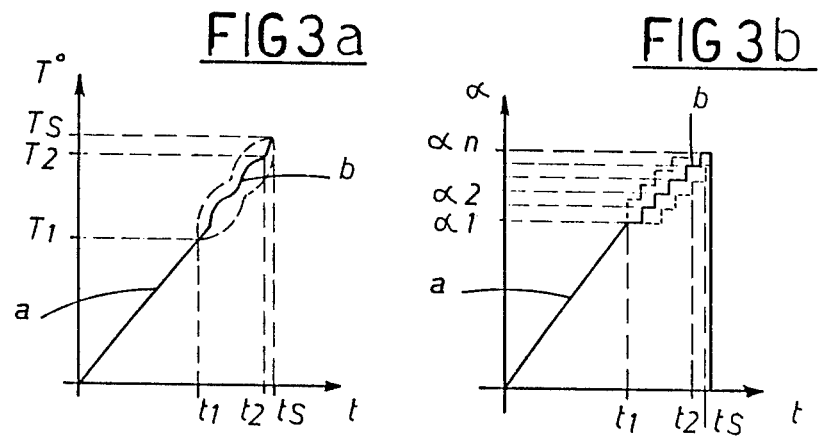

CIRCUIT FOR MONITORING AND CONTROLLING THE FLOW OF HOT AIR IN EQUIPMENT FOR ROASTING COFFEE, NUTS AND SIMILAR EDIBLE COMMODITIES

BACKGROUND OF THE INVENTION

The invention disclosed relates to a circuit for monitoring and controlling the flow of hot air in equipment for roasting coffee, nuts and similar edible commodities.

Conventionally, the process of roasting a given quantity of coffee is implemented in two distinct steps. First, the coffee is subjected to a pre-roast application of heat to lower its moisture content, selecting temperature values such as are able to ensure a well-balanced color of the beans; to best advantage, the temperature adopted in pre-roasting the raw commodity will be of the order of 150°–160° C.

The successive second step involves subjecting the pre-heated product to roast temperature proper, generally 220°–230° C.

Needless to say, the temperatures effectively used can vary considerably according to the different qualities of roast it is wished to produce. The need for a batch of coffee to be roasted in two distinct and successive steps is dictated by the fact that the single beans will never be ripened to an identical degree. With former methods, by which the full roast was effected in a single operation, attempts to produce the requisite color and flavor on particularly unripe beans led to pyrolisis in the riper beans, with clear negative consequences for the end-product as a whole.

In a previous application for Italian patent filed under No. 3450 A/82 by the same applicant, a system is disclosed whereby the complete coffee roasting cycle can be effected using special equipment that comprises, amongst other components, a first and a second drum of conventional embodiment; these drums are of substantially equal capacity, and will be positioned to best advantage one above the other, or at all events, at dissimilar heights. Thus, in implementing the two steps described above, the pre-roasted coffee beans, divested of moisture in the first drum, can be transferred through suitable ducts into the roasting drum proper, swiftly and at the opportune moment.

The two drums are provided with a respective inlet and outlet to which respective hot air ducts are connected, the hot air being produced by a suitable generator and circulated through the ducts by a fan unit.

The volume of air caused to flow through the inlet and outlet ducts is regulated by dampers programmed to open and shut at selected moments that will vary according to the quantity and quality of the blend and the duration of the roast, and can be operated by manual or automatic means to suit requirements. Hitherto, the major problem besetting the use of equipment of the type in question has been one of arriving at a comprehensive and precise integration of two parameters governing the entire roast cycle, namely: the temperature level generated internally of the two drums, and the time required to reach the selected level. More exactly, the temperature rise programmed for the first drum must be produced in the same interval of time as that programmed for the second drum, by no means a simple matter when one considers the difference between the two levels and the many and various thermal inertia components traceable to the coffee itself.

Where these two temperature rises are faultlessly timed, one achieves a continuous and regular cycle whereby one charge of full roast is emptied from the second drum, and at the same moment, another charge of pre-roast is transferred into the second drum from the first. Additionally, and of great importance, the single roast cycle effected on each charge of coffee will ensure the same pre-roast and roast temperatures as those of the previous cycles, such that the entire batch of coffee turned out during the full program of cycles implemented will be uniformly roasted and colored, giving optimum blends.

Such results have remained unobtainable thus far, in practice, by reason of the fact that the dampers utilized to control the hot air ducts to and from the first and second drums were adjusted by degrees only, opening and closing in discrete steps. The roasting cycle effected on a given quantity of coffee can now be considered in general terms, departing for convenience's sake from the roast proper; this occurs in the second drum, in which a temperature rise approximately between 155°–160° C. and 220°–230° C. must be produced.

Reference may be made here to the graph of FIG. 2a, which shows the variation in temperature T versus time t that occurs internally of the second drum, and to that of FIG. 2b which shows the corresponding variation in the angle $\alpha$ of the damper, also versus time t.

It will be seen that the damper is fully open at the outset: $\alpha = 90°$. A predetermined quantity of hot air (calculated in calories) is directed into the second drum by the fan, sufficient to raise the temperature to an initial level T1 within a given interval of time t1; this is indicated in FIG. 2a by a straight line a, which reflects a substantially linear relationship between T and t, and an angular coefficient denoted $\delta$.

On arrival at T1, the damper will throttle down by some 45°, whereupon the increase in temperature T is slowed up and the set point T2 reached at t2; this further rise is reflected by the straight line denoted b, which has an angluar coefficient of $\delta/2$. The damper closes completely on arrival at T2, at which point the temperature of the coffee is at a level of the order such as to induce spontaneous ignition; accordingly, the temperature T should now rise a few degrees to Ts (phantom line c), reaching a level coinciding with the end-of-cycle mark ts on the time axis, at which discharge is to programmed to occur, and the roast is complete.

The part of the curve denoted c in FIG. 2a reflects the critical point of the roast part of the cycle in the second drum, but is indicative only, as the effective configuration depends on thermal inertia in the coffee (moisture, oils, grease etc.).

The interval of time embraced by the part of the curve c in question is that between the moment of the damper being shut and the moment that the drum begins emptying. In the majority of instances, it happens that the roast is not regulated by the flow of hot air, and the coffee fails to arrive at the spontaneous ignition temperature which produces the rise from set point T2 to discharge Ts; rather, the temperature tends to fall instead of rising (see d in FIG. 2a), and a thermoregulator with its probe located internally of the roasting drum will cut in to re-open the damper, say to 45°, for a further interval from t3 to t4, thereby ensuring that the temperature rises to the prescribed level Ts. The result of such an occurence is that the roast time become extended, and the second drum is not ready to receive the pre-roasted beans from the first drum.

Thus it happens that the pre-roast is forced to remain longer in the first drum also (see FIG. 1a), and even in the unlikely event that the critical stage reflected by curves c and d is avoided (the same criteria apply as for FIG. 2a described above), the temperature of the coffee will fall on arrival at Ts following movement of the damper to the off position, as indicated by the curve denoted f.

Accordingly, a thermoregulator monitoring the first drum will cut in at t5 and re-open the damper, say to 45°, for a further duration t6, thereby enabling the discharge level Ts to be restored; the second drum will in fact have emptied by this time and the pre-roast can be transferred.

In such a situation, the beans in the first drum are invested with more heat than is opportune, and drop into the second drum pre-roasted too highly; thus, the roast step implemented in the second drum must be cut short in order to ensure that the beans will emerge roasted and colored to the same degree as previous charges.

With the roast now cut short, the second drum will be ready to receive a further charge of pre-roast from the first drum before the pre-roasting step is in fact terminated, and should this occur, i.e. in the event that a charge of pre-roast is transferred from the first drum to the second drum short of the temperature level prescribed, one will be left with an under-roasted, lower temperature product at the end of the roast cycle, and the roast step must be prolonged in order to compensate; thus, the pre-roast is forced once again to remain in the first drum (remembering that the cycle is geared to the roast time-lapse in the second drum), and there is a recurrence of all the negative factors examined above. The end result is that one has a succession of fluctuations in roast and pre-roast time-lapses, which become increasingly marked, and the product necessarily suffers through the impossiblility of obtaining a regular roast, and in-particular, a regular color, at each cycle.

More exactly, assuming the number of calories put into the drum as par, a longer roast will allow heat to penetrate deeper into the bean, whereas with a shorter roast, the bean will scorch on the surface and remain raw inside.

Accordingly, the object of the invention is one of overcoming the drawbacks described above.

SUMMARY OF THE INVENTION

The stated object is achieved, according to the present invention, by providing the conventional equipment used to roast coffee, nuts and similar edible commodities, with a circuit for monitoring and controlling the flow of hot air supplied to the pre-roast and roast drums.

In such a circuit, the two dampers serving each drum are operated by drive means, and capable of movement between two limit positions, fully open and fully closed, through intermediate positions that occur in a planned sequence consisting in a first stage of continuous movement followed by a second stage of discrete steps, to the point of reaching the prescribed fully-open, fully-closed or part-open position that ensures correct conditions.

To this end, the drive means are interlocked by way of transducers to a controller, one monitoring input of which is in receipt of signals reflecting the effective temperature and color of the pre-roasting and roasting charges, and another input, of signals reflecting the prescribed temperature and color values to be matched.

Accordingly, the output from the controller is a function of the comparison made between its inputs, and the relative pulses can be utilized to control the opening and closing movement of the dampers, producing a variation in hot air flow to the drums which will ensure, not only that the programmed temperature set point is reached correctly, but also, that it is reached at the prescribed moment.

The advantage of the invention is that it becomes possible to time the temperature rise and duration of the pre-roast and roast steps correctly, thereby eliminating the fluctuations described above and ensuring that the end product emerges in identical condition from each cycle.

BRIEF DESCRIPTION OF THE DRAWINGS

The invention will now be described in detail, by way of example, with the aid of the accompanying drawings, in which:

FIGS. 1a–1b, 2a–2b are sets of graphs, relative to the pre-roast and roast drums respectively, which illustrate the variation in temperature T versus time t, correlated to the angle $\alpha$ at which the dampers are set, likewise versus time t, obtainable with prior art methods;

FIGS. 3a–3b are graphs relative to either durm that illustrate the variation in temperature T versus time t, correlated to the angle $\alpha$ at which the dampers are set, likewise versus time t, obtainable with the circuit disclosed.

DESCRIPTION OF THE PREFERRED EMBODIMENTS

Figure 1:
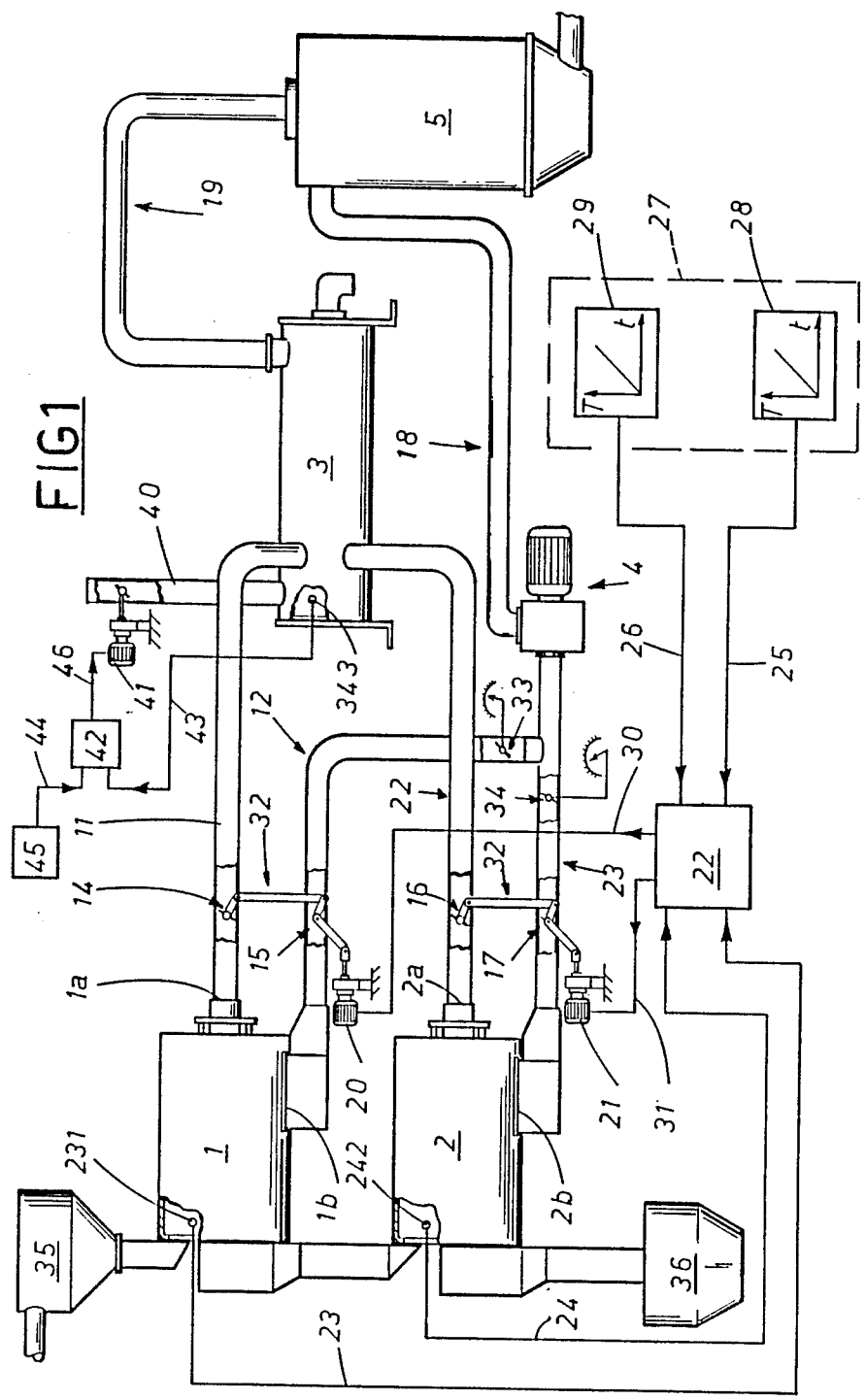
FIG. 1 shows a schematic representation of coffee roasting equipment incorporating the monitoring and control circuit according to the invention.

With reference in particular to FIGS. 1 and 3, a hot air monitoring and control circuit according to the invention is designed for application to equipment for roasting coffee, nuts and similar edibles. A typical embodiment of such roasting equipment will comprise, amongst other components, a first drum 1 and a second drum 2 in which the commodity is treated; more exactly, the first drum 1 serves to pre-roast the beans, whereas the roast proper is effected in the second drum 2.

Each drum 1 and 2 is provided with a respective hot air inlet 1a and 2a and outlet 1b and 2b to which respective pairs of inlet and outlet ducts 11, 12 and 22, 33 are connected; the remaining ends of the ducts connect directly or indirectly with a hot air generator denoted 3. Hot air is drawn into the two drums 1 and 2 by a fan unit 4, into which the two outlet ducts 12 and 23 are routed.

With hot air taken out of the drums 1 and 2 through the outlet ducts 12 and 23 by the fan 4, a degree of negative pressure will be created such as to draw further air through the inlet ducts 11 and 22 from the generator 3. Air exhausted from the fan 4 is directed into a conventional cyclone separator 5 that serves to remove waste matter (skins, husks) entrained from the drums, before being returned to the generator 3 and reheated.

Each of the single inlet and outlet ducts 11, 22 and 12, 23 is controlled by a respective damper 14, 15, 16 and 17, preferably of butterfly flap type embodiment, located at points near to the hot air inlets and outlets of the relativ drum 1, 2.

In a preferred embodment, each pair of dampers 14, 15 and 16, 17 is operated by drive means consisting in a relative stepping motor 20, 21, as in FIG. 1, though the option exists of utilizing double acting hydraulic cylinders, piloted to stroke between two limit positions that correspond to the fully open and fully closed positions of the dampers.

Operation of the motors 20, 21 is interlocked to a controller denoted 22, which consists substantially in a processor and comparator combined, one input of which is in receipt of signals 23, 24 reflecting the effective temperature and color of the beans in the pre-roast and roast drums 1 and 2 respectively; these monitoring signals are sensed by transducers of conventional type, denoted 231 and 242 in FIG. 1, located internally of the relative drums.

The remaining input of the controller 22 will be in receipt of previously entered reference signals 25 and 26 reflecting the temperature and color values prescribed for the contents of the two drums 1, 2; these values are entered at a source processor 27, and memorized as reference curves 28 and 29 that specify the temperature-T-vs-time-t characteristic it is wished to match in each drum 1 and 2.

The controller 22 effects a continuous comparison between the effective temperature and color signals 23, 24, monitored at the drums, and the reference signals 25, 26, and emits pulsed output signals 30 and 31 that are used to pilot each motor 20 and 21 in adjusting the position of the relative dampers 14, 15 and 16, 17.

As FIGS. 3a and 3b indicate, the opening or closing movement of the dampers 14, 15, 16 and 17 consists in a plurality of positions covered in a programmed sequence of two successive stages; the first stage is continuous (straight line a, FIG. 3b), and will open up the damper to an angle $\alpha 1$ that corresponds to an initial thermal transition (straight line a, FIG. 3a) such as ensures arrival at temperature T1 in the two drums 1 and 2; the second stage occurs as a succession of discrete steps (b, in FIG. 3b), and will be seen to correspond to a final thermal transition (curve b, FIG. 3a) that takes temperature in the two drums up to the set point Ts at the prescribed moment in time ts. Thus, variations in temperature T within the pre-roast and roast drums are made to occur in accordance with the reference curves 28 and 29 and time scales entered at the source processor 27.

Controlling the roast in this way, one avoids the problems with thermal inertia that tend to occur during the self-ignition stage in equipment where there is no such hot air control (curves c, d and f in FIGS. 1a and 2a); according to the invention, in fact, the coffee is never left to continue roasting in conditions not controlled by the flow of hot air, and the dampers will close at the moment when discharge occurs.

It will be seeen from FIG. 1 that the dampers of each pair 14, 15 and 16, 17 are yoked together in series and set in motion by way of a mechanical linkage 32 of conventional type, in such a way that a precise movement of the one damper is accompanied by an identical, equally precise movement of the other. The circuit comprises further manually-operated dampers 33 and 34 located in the outlet ducts 12 and 23 between the fan unit 4 and the respective outlet damper 15 and 17; these additional dampers serve to apportion the volume of air supplied to the drums 1 and 2, hence the number of calories, which must differ in view of the dissimilar rises in temperature described above, namely, from 20° C. approx (or ambient) to 155°-160° C. approx in the case of the first drum 1, and from 155°-160° C. approx to 230° C. approx in the case of the second drum 2. Accordingly, the pre-roast and roast set points Ts will be reached in the respective drums 1 and 2 at the prescribed moment in time, thereby ensuring that no fluctuations occur, and that the pre-roast and roast time-lapses are synchronized.

A single cycle consists in filling the first drum with raw coffee beans from a charging hopper 35, the pre-roasting them to the set temperature at the same time as the previous charge is roasting in the second drum 2; this accomplished, the second drum discharges its contents into a bin 36 to cool, the pre-roast is transferred from the first drum to the second, and the cycle is repeated.

Needless to say, any given roast will be obtainable by entering the appropriate reference curves 28 and 29 at the source processor 27.

More precisely, equipment of the type in question can be affected by the additional drawback that pressure tends to vary from one moment to the next internally of the circuit as moisture is released from the beans during the roast, and as natural oils in the coffee undergo combustion and give off gases. Such factors combine to increase the volume of fluid internally of the drums, and therefore to induce continual variations in pressure which are difficult to forecast; furthermore, the rise and fall in pressure leads to irregular operation of the hot air generator 3, which generally will be a direct-acting type, and therefore highly sensitive to instabilities in internal pressure conditions. With this in mind, the pressure level internally of the generator 3 can be guaranteed to remain between prescribed minimum and maximum limits by inclusion of a vent 40 from which air and excess gases can be released; the vent will also incorporate a damper, designed to oepn in response to rising pressure, and to close when pressure falls.

To prevent circuit pressure fluctuating above and below the predetermined level, internally of the generator 3 in particular, the damper controlling the vent 40 will be moved between its two limit positions by relative drive means 41 interlocked to a second controller 42, the comparator inputs of which are in receipt of a monitoring signal 43, reflecting effective circuit pressure sensed by a transducer 343 located inside the generator 3, and a selected reference signal 44 programmed into a second source processor 45. Thus, the controller 42 emits an output signal 46 that is a function of the comparison made between the two input signals 43 and 44, and can be used to pilot operation of the vent damper, positioning it such that pressure in the generator 3 is maintained at the reference value.

The opening and closing movement of the vent damper likewise consists in a predetermined sequence of two successive stages, the first a continuous sweep covering the greater part of the correction, and the second stage occurring as a series of final, discrete steps that complete the correction and restore pressure in the generator 3 to the level selected.

What is claimed:
1. A circuit for monitoring and controlling the flow of hot air in equipment for roasting coffee, nuts and similar edible commodities, comprising:
   first drum and a second drum, each provided with an inlet and an outlet for the passage of hot air;
   a hot air generator, in communication with both drums by way of respective ducts connected to the inlets and outlets;
   a fan unit by which the hot air is circulated through the ducts;

monitoring means located internally of the first drum and the second drum;

a plurality of single dampers located one in each duct adjacent the drum inlets and outlets, operated in pairs and caused to move between a fully open limit position and a fully closed position;

a first controller, consisting in a processor and a comparator, one input of which is in receipt of a set of signals reflecting the effective temperature and color or the roasting commodity as sensed by the monitoring means, and another input, in receipt of a set of reference signals reflecting prescribed temperature and color characteristics as entered at a first source processor;

drive means associated with each pair of dampers, which are interlocked to a respective output signal emitted by the first controller as a function of the comparison made between the monitored signal and the reference signal relative to the respective drum, and designed to invest the relative pair of dampers with an opening and closing movement that consists in a plurality of positions covered in a predetermined sequence of two successive stages: a first continuous stage serving to produce an initial thermal transition, and a second stage occuring as a succession of discrete steps, which completes the overall transition and produces a variation in temperature internally of the drum such as will ensure that the relative temperature set point is reached successfully, and at the prescribed moment in time.

2. A circuit as in claim 1, wherein the single dampers of each pair are yoked together in series and set in motion by way of a relative mechanical linkage of conventional embodiment, in such a way that a precise movement of the one damper is accompanied by an identical precise movement of the other.

3. A circuit as in claim 1, further comprising a pair of dampers located one in each outlet duct between the fan unit and the respective outlet damper, that serve to apportion the volume of hot air, hence the number of calories, supplied to the interior of the two drums.

4. A circuit as in claim 1, wherein the drive means consist in stepping motors.

5. A circuit as in claim 1, further comprising:

a vent, associated with and serving to exhaust air and gases from the hot air generator, controlled by a relative damper;

monitoring means located internally of the hot air generator;

a second controller, consisting in a processor and a comparator, one input of which is in receipt of a signal reflecting the effective pressure level in the hot air generator as sensed by the monitoring means, and another input, in receipt of a reference signal that reflects a given pressure level entered at a second source processor;

drive means, associated with the vent damper, that are interlocked to an output signal emitted by the second controller as a function of the comparison made between the monitored pressure signal and the reference pressure signal, and designed to invest the damper with an opening or closing movement that consists in a plurality of positions covered in a predetermined sequence of two successive stages: a first continuous stage serving to produce an initial transition, and a second stage occuring as a succession of discrete steps, which completes the transition and produces a variation in pressure internally of the generator such as will correct any fluctuation above or below the reference level entered at the relative source processor.

* * * * *